(12) United States Patent
Austin et al.

(10) Patent No.: US 6,622,350 B2
(45) Date of Patent: Sep. 23, 2003

(54) SNAP-LOCKING BUCKLE AND METHOD OF MAKING SAME

(75) Inventors: Barry J. Austin, Houston, TX (US); Patrick J. Novak, North Liberty, IA (US)

(73) Assignee: Capital Safety Inc., Red Wing, MN (US)

( * ) Notice: Subject to any disclaimer, the term of this patent is extended or adjusted under 35 U.S.C. 154(b) by 0 days.

(21) Appl. No.: 10/304,453

(22) Filed: Nov. 25, 2002

(65) Prior Publication Data

US 2003/0088952 A1 May 15, 2003

Related U.S. Application Data

(63) Continuation of application No. 09/850,419, filed on May 7, 2001, now Pat. No. 6,484,372.
(60) Provisional application No. 60/202,413, filed on May 8, 2000.

(51) Int. Cl.[7] .............................................. A44B 11/00
(52) U.S. Cl. .................... 24/312; 24/587.12; 24/573.11
(58) Field of Search .......................... 24/312, 614, 615, 24/625, 633, 634, 338, 647, 636, 637, 584.1, 587.12, 573.11

(56) References Cited

U.S. PATENT DOCUMENTS

| | | | |
|---|---|---|---|
| 3,530,546 A | 9/1970 | Ferrando | 25/75 |
| 4,569,106 A | 2/1986 | Lovato | 24/615 |
| 4,779,315 A | 10/1988 | Kohus | 24/575 |
| 5,203,058 A | 4/1993 | Krauss | 24/575 |
| 5,224,247 A | 7/1993 | Collier | 24/579.1 |
| 5,279,505 A | 1/1994 | Goudreau et al. | 439/37 |
| 5,735,024 A | 4/1998 | Ortiz | 24/575 |

*Primary Examiner*—Robert J. Sandy
(74) *Attorney, Agent, or Firm*—IPLM Group, P.A.

(57) ABSTRACT

A buckle includes a first assembly and a second assembly which are selectively latched to one another. Each assembly includes a keeper and a latch secured between a pair of first and second outer plates. The two assemblies are identical in construction and configured to selectively interlock in a manner that provides a reliable buckle.

23 Claims, 2 Drawing Sheets

SNAP-LOCKING BUCKLE AND METHOD OF MAKING SAME

This application is a continuation on Ser. No. 09/850,419 filed May 7, 2001 U.S. Pat. No. 6,484,372 which claims benefit of No. 60/202,413 filed May 8, 2000.

FIELD OF THE INVENTION

The present invention relates to buckles and more specifically, to buckles having first and second members which are selectively locked to one another by means of a spring-biased latch.

BACKGROUND OF THE INVENTION

Buckles come in many varieties and configurations, and are useful in a wide range of applications. As with any device, trade-offs are typically made between factors such as product reliability and manufacturing cost. An object of the present invention is to provide a buckle which is both reliable and relatively inexpensive to manufacture.

SUMMARY OF THE INVENTION

The present invention provides a buckle which is made of a relatively small number of simple parts. On a preferred embodiment and/or according to a preferred manufacturing method, the buckle comprises first and second interengaging assemblies that are identical. Among other things, each of the preferred embodiment assemblies has a latch and a keeper secured between a pair of identical outer plates. Many of the features and/or advantages of the present invention will become apparent from the detailed description that follows.

BRIEF DESCRIPTION OF THE DRAWINGS

With reference to the Figures of the Drawing, wherein like numerals represent like parts and assemblies throughout the several views.

DETAILED DESCRIPTION OF THE PREFERRED EMBODIMENT

Figure 1:
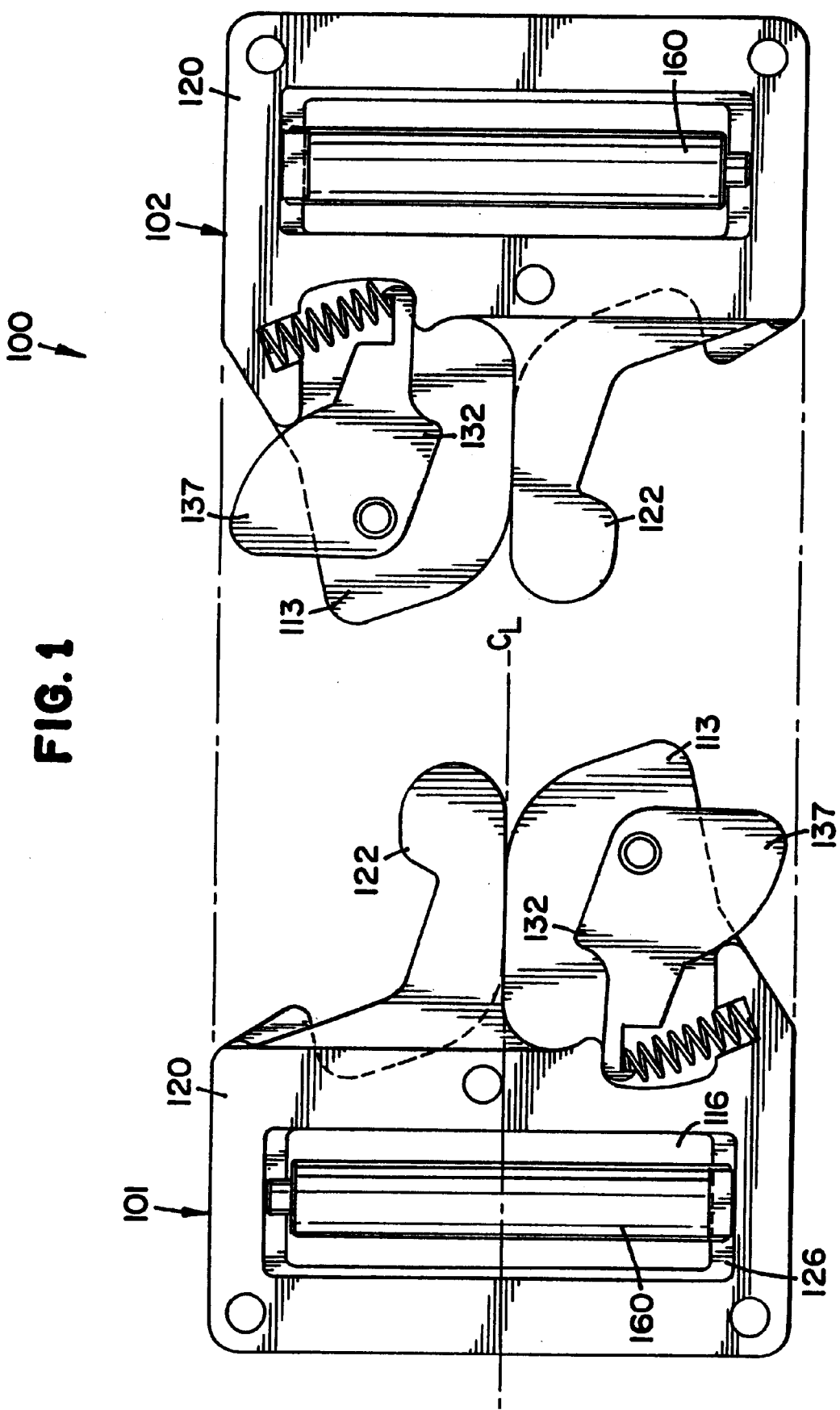
FIG. 1 is a top view of two buckle halves constructed according to the principles of the present invention, with an uppermost plate removed from each of the halves.
Figure 2:
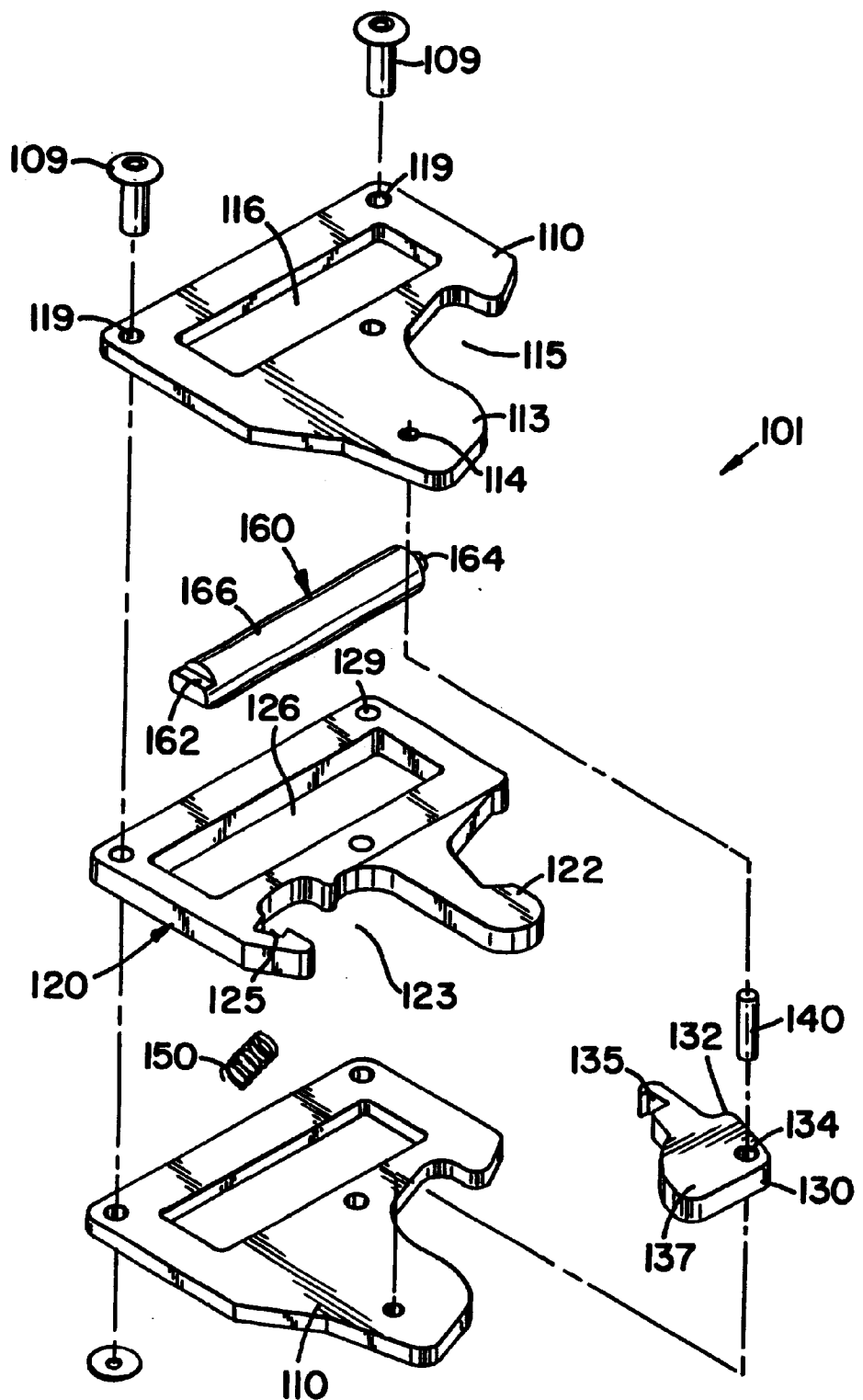
FIG. 2 is an exploded perspective view of one of the buckle halves of FIG. 1.

A preferred embodiment buckle constructed according to the principles of the present invention is designated as 100 in FIG. 1. The buckle 100 includes first and second assemblies or halves 101 and 102 which are identical. For ease of discussion, different reference numerals are used to reference the two identical assemblies 101 and 102. The components of the first assembly 101 are shown apart from one another in FIG. 2. Generally speaking, each assembly 101 and 102 includes first and second outer plates 110; an intermediate or keeper plate 120; a latch 130; a pivot pin 140; a spring 150; and a strap engaging bar 160.

The first and second outer plates 110 are secured together by three rivets 109 (only two are shown) to define a base. The rivets 109 extend through respective holes 119 in the plates 110 and through respective holes 129 in the keeper plate 120. A rectangular opening 116 extends through each plate 110 to facilitate connection of a strap to the buckle. A tab 113 projects from an opposite end of each plate 110, on one side of a centerline CL extending through the plate 110. A similarly configured notch 115 extends into the same end of each plate 110, on an opposite side of the centerline CL. The notches 115 on the first assembly 101 accommodate the tabs 113 on the second assembly 102, and the notches 115 on the second assembly 102 accommodate the tabs 113 on the first assembly 101. A hole 114 extends through each tab 113 to receive the pivot pin 140.

The keeper plate 120 is sandwiched between the first and second outer plates 110. A relatively larger rectangular opening 126 extends through the keeper plate 120 to accommodate the strap engaging bar 160. The opening 126 aligns with the openings 116, and the associated ends of the keeper plate 120 and the outer plates 110 have the same planform. A keeper or hook 122 projects from an opposite end of the keeper plate 120, on the same side of the centerline CL as the notches 115. On an opposite side of the centerline CL, between the tabs 113, a notch 123 extends into the keeper plate 120 to accommodate the latch 130 and the spring 150. A sidewall of the notch 123, facing generally toward the keeper 122 and located in the region designated as 125, is configured to seat or retain an end of the spring 150.

The latch 130 is disposed between the tabs 113 on the first and second outer plates 110, and is held in place by the pivot pin 140. The pivot pin 140 fits loosely through a hole 134 in the latch 130 and is rigidly secured within the holes 114 in the tabs 113. An opposite, distal end 135 of the latch 130 is configured to seat or retain an opposite end of the spring 150. In other words, the spring 150 is disposed between the tabs 113, and compressed between the latch 130 and the keeper plate 120. A side of the latch 130 relatively nearer the centerline CL is provided with a shoulder 132 sized and configured to slidably receive and engage the keeper 122. An opposite side of the latch 130 is provided with a nub 137 that projects laterally outward beyond the tabs 113 (in a direction generally perpendicular to the centerline CL).

The strap engaging bar 160 includes a cylindrical intermediate portion 166, a first, cylindrical end 164 having a relatively smaller diameter than the intermediate portion 166, and a second, opposite end 162 having a generally rectangular cross-section which is bounded at its shorter ends by extensions of the cylindrical surface defined by the intermediate portion 166. The diameter of the first end 164 and the thickness of the second end 162 (as measured perpendicular to the relatively longer sides) are less than the thickness of the keeper plate 120. The bar 160 fits within the opening 126 in the keeper plate 120, and the ends 164 and 162 of the bar 160 are disposed between the first and second outer plates 110, with the intermediate portion 166 of the bar 160 projecting into the openings 116. The bar 160 cooperates with the outer plates 110 to retain a strap in a manner known in the art.

In a preferred application of the subject invention, a strap is secured to each of the assemblies 101 and 102, and the assemblies 101 and 102 are selectively interconnected to secure a fall-arresting harness relative to a person. In view of the stringent demands associated with this application (and the need to meet industry standards for fall-arrest equipment), the components of the buckle 100 are preferably made of metal, and most preferably steel. For less demanding applications, the components could be made of plastic, in which case, the latch could be a leaf spring integrally joined to the keeper plate.

In any event, each of the assemblies 101 and 102 is preferably secured to a respective strap by means of the bar 160 and openings 116 and 126. The assemblies 101 and 102 are then positioned as shown in FIG. 1 and pushed toward one another. The keeper 122 on the first assembly 101 bears against the latch 130 on the second assembly 102 and causes it to rotate counter-clockwise until the shoulder 132 snaps in place behind the keeper 122. Similarly, the keeper 122 on the second assembly 102 bears against the latch 130 on the first assembly 101 and causes it to rotate counter-clockwise until the shoulder 132 snaps in place behind the keeper 122. The springs 150 bias respective latches 130 in a clockwise direction and thereby bias the assemblies 101 and 102 to remain latched to one another. The assemblies 101 and 102 may be unlatched from one another by simultaneously rotating both nubs 137 counter-clockwise and pulling the assemblies 101 and 102 apart from one another.

An advantage of the present invention is that the buckle 100 requires a relatively small number of discrete parts, thereby contributing to manufacturing efficiency. For example, the same outer plate 110 is used on both the top and bottom of each buckle assembly 101 and 102. Also, the use of two identical assemblies 101 and 102 contributes to manufacturing efficiency, as well as potential maintenance/replacement issues. The commonality of components also facilitates the provision of a latch on each of the assemblies 101 and 102, thereby enhancing the reliability of the buckle 100. Among other things, both latches 137 must be operated from opposite directions to unlatch the buckle 100, and the keepers 120 bear against one another for added structural integrity. Moreover, if either one of the latches 130 fails, the other latch 130 will remain effective.

The present invention has been described with reference to a preferred embodiment and a specific application. Recognizing that this disclosure will enable those skilled in the art to recognize additional embodiments, applications, and/or modifications, the scope of the present invention should be limited only to the extent of the following claims.

What is claimed is:

1. A buckle, comprising:
   a first base having a first keeper projecting therefrom, a first latch pivotally mounted on the first base, and a first spring interconnecting the first base and the first latch to bias the first latch; and
   a second base having a second keeper projecting therefrom, a second latch pivotally mounted on the second base, a second spring interconnecting the second base and the second latch to bias the second latch, wherein the first keeper is configured and arranged to interlock with the second latch and the second keeper is configured and arranged to interlock with the first latch to interlock the first base and the second base together.

2. The buckle of claim 1, wherein the first base and the second base are identical.

3. The buckle of claim 1, further comprising a first rectangular opening in the first base.

4. The buckle of claim 3, further comprising a second rectangular opening in the second base.

5. The buckle of claim 3, further comprising a first bar within the first rectangular opening.

6. The buckle of claim 5, further comprising a second bar within the second rectangular opening.

7. A first assembly of a buckle, comprising:
   a base having a keeper projecting from an end of the base;
   a latch pivotally mounted on the base; and
   a spring interconnected between the base and the latch to bias the latch.

8. The first assembly of claim 7, wherein said keeper is configured and arranged to interlock with a second latch of a second assembly thereby interlocking the two assemblies together.

9. The first assembly of claim 8, wherein the two assemblies are identical.

10. A buckle, comprising:
    a first assembly and a second assembly which are selectively locked to one another, wherein each said assembly has a base, including a first end adapted for connection to a strap, and a second end adapted for engagement with the second end on an opposing assembly, the first assembly has a keeper projecting from the second end of the base, the second assembly has a latch pivotally mounted on the base and configured to interlock with the keeper on the first assembly, and a spring interconnected between the base and the latch to bias the latch to remain interlocked with the keeper on the first assembly.

11. The buckle of claim 10, wherein the first assembly base includes first and second plates, and the keeper is sandwiched between the plates.

12. The buckle of claim 10, wherein the second assembly base includes first and second plates, and the latch is pivotally mounted between the plates.

13. The buckle of claim 12, further comprising a third plate sandwiched between the first and second plates.

14. The buckle of claim 13, wherein the spring is compressed between the latch and a portion of the third plate.

15. The buckle of claim 12, wherein at least one of the plates defines an outwardly opening notch, and a portion of the latch projects into the notch.

16. A buckle, comprising:
    first and second halves which are selectively locked to one another, each of the halves comprising:
    (a) a base having a first end and a second end, wherein the first end is adapted for connection to a strap, and the second end is adapted for engagement with the second end on an opposing one of the halves;
    (b) a keeper projecting from the second end of the base;
    (c) a latch pivotally mounted on the base and configured to interlock with the keeper on an opposing one of the halves; and
    (d) a spring that biases the latch to remain interlocked with the keeper on an opposing one of the halves.

17. The buckle of claim 16, wherein each said base includes first and second plates, and each said keeper is sandwiched between respective said plates.

18. The buckle of claim 16, wherein each said base includes first and second plates, and each said latch is pivotally mounted between respective said plates.

19. The buckle of claim 18, wherein each of said halves further comprises a third plate sandwiched between respective said first and second plates.

20. The buckle of claim 19, wherein each said spring is compressed between a respective said latch and a portion of a respective said third plate.

21. The buckle of claim 19, wherein each said keeper is an integral portion of a respective said third plate.

22. The buckle of claim 18, wherein at least one of the plates on each said base defines a respective outwardly opening notch, and a portion of each said latch projects into a respective said notch.

23. The buckle of claim 22, wherein when the two halves are locked together, the notch on one said base opens in a first direction, and the notch on the other said base opens in a second, opposite direction.

* * * * *